United States Patent [19]

Yachigo et al.

[11] Patent Number: 4,525,514
[45] Date of Patent: Jun. 25, 1985

[54] STABILIZER FOR POLYMERIC SUBSTANCE AND POLYMERIC SUBSTANCE COMPOSITION CONTAINING THE SAME

[75] Inventors: Shinichi Yachigo, Toyonaka; Tamaki Ishii, Suita; Yukoh Takahashi, Toyonaka; Yutaka Terada, Nishinomiya, all of Japan

[73] Assignee: Sumitomo Chemical Co., Ltd., Osaka, Japan

[21] Appl. No.: 610,941

[22] Filed: May 17, 1984

Related U.S. Application Data

[63] Continuation of Ser. No. 440,704, Nov. 8, 1982, abandoned.

[30] Foreign Application Priority Data

Nov. 17, 1981 [JP] Japan .................. 56-184865

[51] Int. Cl.³ .................................................. C08K 5/36
[52] U.S. Cl. .................................. 524/291; 524/302
[58] Field of Search .................. 524/291, 302, 289

[56] References Cited

U.S. PATENT DOCUMENTS

| | | | |
|---|---|---|---|
| 3,536,661 | 10/1970 | Hagemeyer et al. | 524/333 |
| 3,629,194 | 12/1971 | Onishi et al. | 524/302 |
| 4,168,387 | 9/1979 | Cottman | 524/291 |
| 4,365,032 | 12/1982 | Yosizato et al. | 524/291 |

FOREIGN PATENT DOCUMENTS 82306123.9 of 0000 European Pat. Off. .

OTHER PUBLICATIONS

J. Reid Shelton "Stabilization Fundamentals in Thermal Autoxidation of Polymers"-*Stabilization and Degradation of Polymers*, 1978, 215-225, David L. Allara and Walter L. Hawkins, editors, American Chemical Society, Washington, D.C.

Primary Examiner—Veronica P. Hoke
Attorney, Agent, or Firm—Wenderoth, Lind & Ponack

[57] ABSTRACT

A stabilizer for polymeric substances made up of a sulfur-containing compound of the formula:

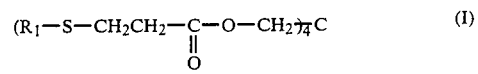

wherein $R_1$ represents an alkyl group having 4 to 20 carbon atoms and a phenolic compound of the general formula:

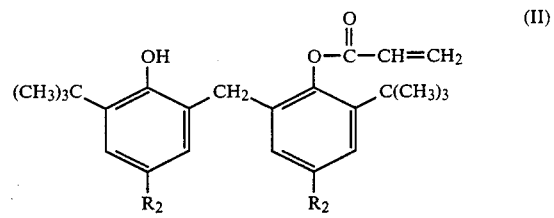

wherein $R_2$ represents an alkyl group having 1 to 4 carbon atoms, in the ratio (I):(II) of 1:0.1–2 by weight.

The combination of the above stabilizer with a polymeric substance, such as synthetic rubber is also contemplated herein.

6 Claims, No Drawings

STABILIZER FOR POLYMERIC SUBSTANCE AND POLYMERIC SUBSTANCE COMPOSITION CONTAINING THE SAME

This is a continuation of now abandoned application Ser. No. 440,704 filed Nov. 8, 1982 abandoned.

The present invention relates to stabilizers for polymeric substances which impart excellent stability to heat, light and oxidation for polymeric substances and to stabilized polymeric substance compositions containing said stabilizers.

It is well known that polymeric substances such as synthetic rubbers, synthetic resins, etc. are deteriorated by the action of heat, light and oxygen during their production, storage, processing or use, and are markedly lowered in their physical properties, accompanied with such phenomena as discoloration, softening, gellation and embrittlement.

To prevent such phenomena, various phenolic, or phosphite-type or sulfur-containing antioxidants have been heretofore added, singly or in combination, during the production or processing of such polymeric substances.

For example, it is known to use a phenolic antioxidant singly, such as styrenated phenol; 2,6-di-t-butyl-4-methylphenol; 2,2'-methylene-bis(4-methyl-6-t-butyl-phenol); n-octadecyl-$\beta$-(3,5-di-t-butyl-4-hydroxyphenyl)propionate; pentaerythritol-tetrakis[$\beta$-(3,5-di-t-butyl-4-hydroxyphenyl)propionate], etc., or to use such a phenolic antioxidant together with a phosphite-type antioxidant such as tris(nonylphenyl)phosphite, distearyl pentaerythritol diphosphite, or to use a said phenolic antioxidant in combination with a sulfur-containing antioxidant such as lauryl thiodipropionate, distearyl thiodipropionate, etc. However, these methods are not satisfactory enough in respect of stability to heat, light and oxidation, stability to heat discoloration and stability to vaporization.

We studied intensively to solve these problems, and as a result, we found that a stabilizer composed of a particular ratio of a specific phenolic compound and a specific sulfur-containing compound has very good properties as a stabilizer for polymeric substances, such that it is able to give polymeric substances excellent stability to heat, light and oxidation and also excellent stability to heat discoloration. This discovery led us to the present invention.

That is to say, the present invention provides a stabilizer for polymeric substances which is composed of a sulfur-containing compound represented by the following general formula (I) and a phenolic compound represented by the following general formula (II) in the ratio (I):(II) of 1:0.1–2 by weight.

$$(R_1-S-CH_2CH_2-\overset{O}{\underset{\|}{C}}-O-CH_2)_4C \quad (I)$$

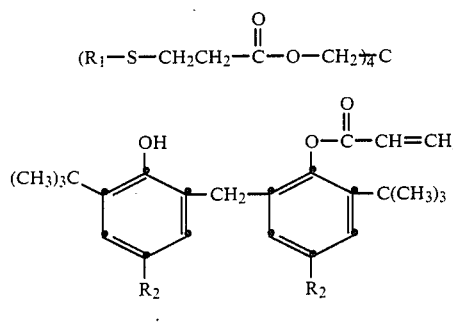
(II)

wherein $R_1$ stands for an alkyl group having 4 to 20 carbon atoms, and $R_2$ stands for an alkyl group having 1 to 4 carbon atoms.

In each of the compounds represented by the general formulas (I) and (II), the substituent group $R_1$ may be butyl, hexyl, nonyl, dodecyl, cetyl, stearyl, eicocyl, etc., in which alkyl groups of 6 to 18 carbon atoms are preferred, and among others dodecyl is most preferable, and as the substituent group $R_2$, methyl, ethyl, propyl and butyl are the examples, in which methyl and ethyl are preferred and particularly methyl is preferred.

In the following, representative examples of compounds expressed by each of the above-mentioned general formulas used in the present invention are shown in Tables 1 and 2.

TABLE 1

$$(R_1-S-CH_2CH_2-\overset{O}{\underset{\|}{C}}-O-CH_2)_4C$$

| Abbreviation | $R_1$ |
|---|---|
| I-1 | $-C_6H_{13}$ |
| I-2 | $-C_{12}H_{25}$ |
| I-3 | $-C_{18}H_{37}$ |

TABLE 2

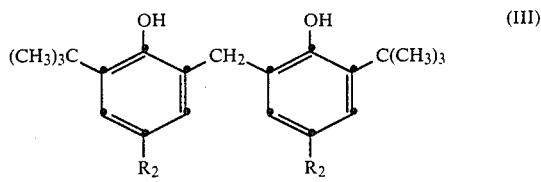

| Abbreviation | $R_1$ |
|---|---|
| II-1 | $-CH_3$ |
| II-2 | $-CH_2CH_3$ |
| II-3 | $-\underset{\underset{CH_3}{\|}}{CH}CH_2CH_2$ |
| II-4 | $-C(CH_3)_3$ |

Such compounds shown by each of the general formulas can be produced by various methods.

For example, the phenolic compounds expressed by the general formula (II) can be produced by reacting, in the usual way, 2,2'-methylene-bis(6-t-butyl-4-alkyl-phenol) (represented by the general formula (III)

(III)

wherein R has the same meaning as mentioned above) with acrylic acid or a lower alkyl ester thereof, or its acid chloride.

As mentioned above, the stabilizers for polymeric substances of the present invention are composed, as effective ingredients, of the sulfur-containing compound (I) represented by the general formula (I) and the phenolic compound (II) represented by the general formula (II), the ratio of the two ingredients being generally 0.1 to 2 times, preferably 0.2–1 times by weight of the phenolic compound relative to the sulfur-containing compound.

Upon the use of the stabilizer for polymeric substances of the present invention, the two ingredients may be previously mixed in the above-mentioned ratio, or each ingredient may be added separately to the polymeric substance so that the ratio of the two ingredients will be within the above-mentioned ratio.

The addition of the sulfur-containing compound and phenolic compound to be polymeric substance includes various methods: (1) when the polymeric substance is produced by a usual method, for example by emulsion polymerization process, emulsions of each of the two ingredients or an emulsion containing the two ingredients is prepared beforehand and is added to the latex; (2) when it is produced by bulk polymerization process or suspension polymerization process, the two ingredients are added to the monomer which is the starting material of polymerization, or to prepolymer, each separately or as a mixture of the two ingredients; (3) when it is produced by solution polymerization process, a solution of the two ingredients previously dissolved in a suitable organic solvent is added to gum cement; (4) irrespectively of production process, the two ingredients are each added separately or a mixture of the two ingredients is added directly. These methods of addition are arbitrarily selected.

The quantity of use of the stabilizer for polymeric substances of the present invention (as the sum of the sulfur-containing compound and phenolic compound) is generally 0.1 to 2 weight parts, preferably 0.3 to 1.5 weight parts, for 100 weight parts of the polymeric substance. The polymeric substance composition containing the stabilizer for polymeric substance of the invention has excellent properties such that it is excellent in stability to heat, light and oxidation and has a less tendency of discoloration by heat.

Of course, such a polymeric substance composition may contain other additives except the stabilizers of the present invention, for example, ultraviolet absorber, light stabilizer, antioxidant, metal-deactivator, metallic soap, nucleating agent, lubricant, antistatic agent, flame retardant, pigment and filler.

Among others, the addition of a ultraviolet absorber or a hindered amine-type light stabilizer can improve the resistance to light of the polymeric substance composition. As such light stabilizers there may be mentioned for example 2-hydroxy-4-methoxy-benzophenone; 2-hydroxy-4-n-octoxybenzophenone; 2(2-hydroxy-5-methylphenyl)benzotriazole; 2(2-hydroxy-3-t-butyl-5-methylphenyl)-5-chlorobenzotriazole; 2(2-hydroxy-3,5-di-t-butylphenyl)-5-chlorobenzotriazole; 2(2-hydroxy-3,5-di-amylphenyl)benzotriazole; Ni salt of butylamine[2,2'-thiobis(4-t-octylphenolate)]; 2,2,6,6-tetramethyl-4-piperidinyl benzoate; bis(2,2,6,6-tetramethyl-4-piperidinyl)cebacate; bis(1,2,2,6,6-pentamethyl-4-piperidyl)-2-(3,5-di-t-butyl-4-hydroxybenzyl)-2-n-butyl-malonate; 1-[2-{3-(3,5-di-t-butyl-4-hydroxyphenyl)propionyloxy}ethyl]4-[3-(3,5-di-t-butyl-4-hydroxyphenyl)-propionyloxy]-2,2,6,6-tetramethylpiperidine; polycondensate of dimethyl succinate and 1-(2-hydroxyethyl)-4-hydroxy-2,2,6,6-tetramethylpiperidine, etc.

Also, by adding a phosphite-type antioxidant, it is possible to improve its discoloration. As such phosphite-type antioxidants, there may be mentioned, for example, distearylpentaerythritol diphosphite; tris(2,4-di-t-butylphenyl)phosphite; tris(2-t-butyl-4-methylphenyl)phosphite; bis(2,4-di-t-butylphenyl)pentaerythritol diphosphite; bis(2,4-di-t-butylphenyl)pentaerythritol diphosphite; tetramis(2,4-di-t-butylphenyl)-4,4'-biphenylene diphosphite, etc.

The polymeric substances that can be stabilized by the stabilizers for polymeric substances of the present invention are mainly synthetic rubbers and synthetic resins. Among such rubbers may be mentioned synthetic rubbers such as solution-polymerized polybutadiene rubber, solution-polymerized polyisoprene rubber, solution-polymerized styrene-butadiene copolymer rubber, ethylene-propylene terpolymer rubber, isoprene-isobutylene copolymer rubber, emulsion-polymerized styrene-butadiene copolymer rubber, emulsion-polymerized acrylonitrile-butadiene copolymer rubber, etc. The stabilizers of the present invention are particularly effective for solution-polymerized polybutadiene rubber, solution-polymerized polyisoprene rubber and solution-polymerized styrene-butadiene rubber.

Also, among such synthetic resins may be mentioned polyolefin resins, acrylonitrile-butadiene-styrene terpolymer resins (ABS resins), polystyrene resins, high impact polystyrene resins, polyamide resins, polyester resins, polycarbonate resins, polyacetal resins and polyurethane resins. The stabilizers of the present invention are particularly effective for styrene-type resins and among others ABS resins.

REFERENCE EXAMPLE 1

Into a four-mouth flask of 500 ml capacity, equipped with a thermometer, a dropping funnel and a stirrer, there are charged 82.0 g (0.241 mol) of 2,2'-methylene bis(6-t-butyl-4-methylphenol), 200 g toluene and 29.3 (0.29 mol) triethylamine. The air in the flask is replaced with nitrogen and the contents in the flask are cooled to 1° C. From the dropping funnel, 75 g of a mixed solution of 25 g (0.276 mol) acryloyl chloride and 50 g toluene is added dropwise in two hours. After the completion of addition, excess quantity of triethylamine is neutralized with dilute hydrochloric acid, and the resulting triethylamine hydrochloride is filtered off. The filtrate is washed with water and separated, and 180 g toluene is distilled away from the organic phase. When the distillation residue is recrystallized from 50 g n-hexane, 90 g (yield 95%) white crystals (II-1) are obtained. m.p. 133°–134° C.

EXAMPLE 1

The compound to be tested shown in Tables 3 and 4 were kneaded by means of rolls into solution-polymerized polybutadiene rubber containing no antioxidant (rubber obtained by extracting the antioxidant from JSR BR-01 with acetone). The thus-obtained rubbers were used as sample rubbers and they were tested for the stability to heat and oxidation and resistance to heat-discoloration.

The results are shown in Tables 3 and 4.

To obtain the stability to heat and oxidation, the sample rubbers were aged by heat in a gear oven at 100° C., and the gel portion (toluene-insoluble portion) was measured at every 15 hours and the time until the gel portion reached 10 weight % (Gel I. P. hours) was evaluated as the stability to heat and oxidation.

The resistance to heat-discoloration was evaluated by the color of the rubbers after heat-ageing for 15, 60 and 120 hours in a gear oven at 100° C.

In the Tables, signs AO-1 to AO-5 show the following compounds:

AO-1 2,6-di-t-butyl-4-methylphenol,
AO-2 n-octadecyl-β-(3,5-di-t-butyl-4-hydroxyphenyl)-propionate,
AO-3 pentaerythritol-tetrakis[β-(3,5-di-t-butyl-4-hydroxyphenyl)propionate],
AO-4 dilauryl thiodipropionate, and
AO-5 tris(nonylphenyl)phosphite.

TABLE 3

| Compounds tested | Added quantities (PHR) and test results Examples according to the invention | | | | | |
|---|---|---|---|---|---|---|
| | 1 | 2 | 3 | 4 | 5 | 6 |
| II-1 | 0.25 | 0.25 | 0.25 | 0.5 | | |
| II-2 | | | | | 0.25 | 0.25 |
| I-1 | 0.75 | | | | 0.75 | |
| I-2 | | 0.75 | 1.0 | 1.0 | | 0.75 |
| Gel IP (hours) | 155 | 170 | 185 | 210 | 145 | 155 |
| Resistance to heat discoloration | | | | | | |
| 0 hr | white | white | white | white | white | white |
| 15 hrs | ″ | ″ | ″ | ″ | ″ | ″ |
| 60 hrs | ″ | ″ | ″ | ″ | ″ | ″ |
| 120 hrs | ″ | ″ | ″ | ″ | ″ | ″ |

TABLE 4

| Compounds tested | Added quantities (PHR) and test results Comparison Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| II-1 | 0.25 | 0.25 | | | | | | | | | | |
| II-2 | | | 0.25 | 0.25 | | | | | | | | |
| AO-1 | | | | | 0.25 | 0.25 | 0.25 | 0.25 | | | | |
| AO-2 | | | | | | | | | 0.25 | 0.25 | 0.25 | 0.25 |
| AO-3 | | | | | | | | | | | | |
| I-1 | | | | | 0.75 | | | | 0.75 | | | |
| I-2 | | | | | | 0.75 | | | | 0.75 | | |
| AO-4 | 0.75 | | 0.75 | | | | 0.75 | | | | 0.75 | |
| AO-5 | | 0.75 | | 0.75 | | | | 0.75 | | | | 0.75 |
| Gel IP (hrs) | 35 | 35 | 35 | 30 | 50 | 55 | 80 | 120 | 75 | 85 | 60 | 85 |
| Resistance to heat-discoloration | | | | | | | | | | | | |
| 0 hr | w | w | w | w | w | w | w | w | w | w | w | w |
| 15 hrs | ″ | ″ | ″ | ″ | ″ | ″ | ″ | ″ | ″ | ″ | ″ | ″ |
| 60 hrs | y | y | y | y | py | py | ″ | ″ | py | py | py | ″ |
| 120 hrs | ″ | ″ | ″ | ″ | y | y | y | y | y | y | y | py |

| Compounds tested | Comparison Examples | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| II-1 | | | | | 0.25 | 0.5 | 1.0 | | | | | |
| II-2 | | | | | | | | 0.25 | 1.0 | | | |
| AO-1 | | | | | | | | | | 0.25 | 1.0 | |
| AO-2 | | | | | | | | | | | | 0.25 |
| AO-3 | 0.25 | 0.25 | 0.25 | 0.25 | | | | | | | | |
| I-1 | 0.75 | | | | | | | | | | | |
| I-2 | | 0.75 | | | | | | | | | | |
| AO-4 | | | 0.75 | | | | | | | | | |
| AO-5 | | | | 0.75 | | | | | | | | |
| Gel IP (hrs) | 95 | 120 | 85 | 115 | 10 | 20 | 35 | 10 | 25 | 40 | 100 | 35 |
| Resistance to heat-discoloration | | | | | | | | | | | | |
| 0 hr | w | w | w | w | w | w | w | w | w | w | w | w |
| 15 hrs | ″ | ″ | ″ | ″ | py | ″ | ″ | py | ″ | ″ | ″ | ″ |
| 60 hrs | ″ | ″ | py | ″ | y | y | y | y | y | py | ″ | y |
| 120 hrs | py | py | y | py | ″ | ″ | ″ | ″ | ″ | y | py | ″ |

| Compounds tested | Comparison Examples | | | | | | | |
|---|---|---|---|---|---|---|---|---|
| | 25 | 26 | 27 | 28 | 29 | 30 | 31 | 32 (no addition) |
| II-1 | | | | | | | | |
| II-2 | | | | | | | | |
| AO-1 | | | | | | | | |
| AO-2 | 1.0 | | | | | | | |
| AO-3 | | 0.25 | 1.0 | | | | | |
| I-1 | | | | 0.75 | | | | |
| I-2 | | | | | 0.75 | | | |
| AO-4 | | | | | | 0.75 | | |
| AO-5 | | | | | | | 0.75 | |
| Gel IP (hrs) | 80 | 40 | 85 | 20 | 20 | 20 | 25 | 5 |
| Resistance to heat-discoloration | | | | | | | | |
| 0 hr | w | w | w | w | w | w | w | w |
| 15 hrs | ″ | ″ | ″ | py | py | py | ″ | y |
| 60 hrs | ″ | py | ″ | y | y | y | y | ″ |

TABLE 4-continued

| | Added quantities (PHR) and test results | | | | | | | |
|---|---|---|---|---|---|---|---|---|
| 120 hrs | py | y | py | " | " | " | " | " |

Note:
w = white, y = yellow, py = pale yellow

EXAMPLE 2

To a 5% toluene solution of solution-polymerized polyisoprene rubber containing no antioxidant (rubber obtained by extracting the antioxidant from JSR IR-2200 with acetone), the compounds to be tested shown in Tables 5 and 6 were respectively added and stirred to make uniform solutions. The residues after removal of toluene from these solutions were used as sample rubbers, and they were tested for the stability to heat and oxidation and resistance to heat-discoloration.

The results are shown in Tables 5 and 6.

To obtain the stability to heat and oxidation, the sample rubbers were aged by heat in a gear oven at 70° C. for 7 days, and then the plasticity was measured by a Wallace Rapid Plastometer. The stability was evaluated by the plasticity retention index (PRI) from the following formula:

$$PRI\ (\%) = \frac{\text{Plasticity after ageing}}{\text{Plasticity before ageing}} \times 100$$

The resistance to heat discoloration was evaluated by the color of the rubber after ageing for 7 days in a gear oven at 70° C.

TABLE 5

| Compounds tested | Added quantities (PHR) and test results | | | | | |
|---|---|---|---|---|---|---|
| | Examples according to the invention | | | | | |
| | 1 | 2 | 3 | 4 | 5 | 6 |
| II-1 | 0.25 | 0.25 | 0.25 | 0.5 | | |
| II-2 | | | | | 0.25 | 0.25 |
| I-1 | 0.75 | | | | 0.75 | |
| I-2 | | 0.75 | 1.0 | 1.0 | | 0.75 |
| After 7 days at 70° C. | | | | | | |
| PRI | 60 | 70 | 70 | 75 | 55 | 60 |
| Color | w | w | w | w | w | w |

TABLE 6

| Compounds tested | Added quantities (PHR) and test results | | | | | | | | | | | |
|---|---|---|---|---|---|---|---|---|---|---|---|---|
| | Comparison Examples | | | | | | | | | | | |
| | 1 | 2 | 3 | 4 | 5 | 6 | 7 | 8 | 9 | 10 | 11 | 12 |
| II-1 | 0.25 | 0.25 | | | | | | | | | | |
| II-2 | | | 0.25 | 0.25 | | | | | | | | |
| AO-1 | | | | | 0.25 | 0.25 | 0.25 | 0.25 | | | | |
| AO-2 | | | | | | | | | 0.25 | 0.25 | 0.25 | 0.25 |
| AO-3 | | | | | | | | | | | | |
| I-1 | | | | | 0.75 | | | | 0.75 | | | |
| I-2 | | | | | | 0.75 | | | | 0.75 | | |
| AO-4 | 0.75 | | 0.75 | | | | 0.75 | | | | 0.75 | |
| AO-5 | | 0.75 | | 0.75 | | | | 0.75 | | | | 0.75 |
| After 7 days at 70° C. | | | | | | | | | | | | |
| PRI | 30 | 30 | 25 | 25 | 25 | 25 | 20 | 30 | 25 | 25 | 15 | 25 |
| Color | py | py | y | y | y | y | y | y | y | y | y | y |

| Compounds test | Comparison Examples | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 | 25 |
| II-1 | | | | | 0.25 | 0.5 | 1.0 | | | | | | |
| II-2 | | | | | | | | 0.25 | 1.0 | | | | |
| AO-1 | | | | | | | | | | 0.25 | 1.0 | | |
| AO-2 | | | | | | | | | | | | 0.25 | 1.0 |
| AO-3 | 0.25 | 0.25 | 0.25 | 0.25 | | | | | | | | | |
| I-2 | 0.75 | | | | | | | | | | | | |
| I-2 | | 0.75 | | | | | | | | | | | |
| AO-4 | | | 0.75 | | | | | | | | | | |
| AO-5 | | | | 0.75 | | | | | | | | | |
| After 7 days at 70° C. | | | | | | | | | | | | | |
| PRI | 20 | 25 | 20 | 25 | 20 | 25 | 35 | 20 | 30 | 20 | 40 | 15 | 30 |
| Color | y | y | y | y | y | y | py | y | py | y | py | y | py |

| Compounds tested | Comparison Examples | | | | | | |
|---|---|---|---|---|---|---|---|
| | 26 | 27 | 28 | 29 | 30 | 31 | 32 (no addition) |
| II-1 | | | | | | | |
| II-2 | | | | | | | |
| AO-1 | | | | | | | |
| AO-2 | | | | | | | |
| AO-3 | 0.25 | 1.0 | | | | | |
| I-1 | | | 0.75 | | | | |
| I-2 | | | | 0.75 | | | |
| AO-4 | | | | | 0.75 | | |
| AO-5 | | | | | | 0.75 | |
| After 7 days at 70° C. | | | | | | | |
| PRI | 20 | 35 | 5> | 5> | 5> | 5> | 5> |

TABLE 6-continued

| | Added quantities (PHR) and test results | | | | | | |
|---|---|---|---|---|---|---|---|
| Color | y | py | y | y | y | y | y |

EXAMPLE 3

To a grafted ABS latex, suspensions obtained by bead-peptizing the compounds shown in Tables 7 and 8 by means of an anionic surface-active agent were added respectively in the quantities shown in Tables 7 and 8. In the usual way, the latexes were salted out with an aqueous magnesium sulfate solution, filtered, washed with water and dried. The thus-obtained ABS resin powders were used as test samples. Using the ABS resin powders and by the following procedure, the stability to heat and oxidation was evaluated. The results are shown in Tables 7 and 8.

1. The degree of discoloration of the ABS resin after heat-ageing in a gear oven at 180° C. was observed.
2. Using a measuring apparatus of oxygen absorption induction period, the oxygen absorption induction period (I.P.) was measured in an oxygen atmosphere at 170° C.
3. The ABS resin powder was extruded repeatedly through a small extruder (screw D=20 mm φ, L/D=25; strant die D=3 mm φ, L/D=10) under the following conditions, and the discoloration of the ABS pellets after the fourth extrusion was evaluated by the color difference ΔYI from the non-added ABS pellets of the first extrusion.

Extrusion conditions:

| Number of revolution | 40 rpm | | | |
|---|---|---|---|---|
| | $C_1$ | $C_2$ | $C_3$ | $C_4$ |
| Temperature: | 220° | 240° | 260° | 280° C. |

4. The ABS pellets after the fourth extrusion obtained by the procedure of the item 3 were compression molded at 180° C. for 10 minutes to produce the NO. 1 test pieces specified in JIS K-7111. The test pieces were measured in accordance with JIS K-7111 for the Charpy impact value with a Charpy impact testing machine.

In Table 8, AO-6 means the following compound: 2,2'-methylene bis(4-methyl-6-t-butylphenol)

TABLE 7

| | Added quantities (PHR) and test results | | | | | |
|---|---|---|---|---|---|---|
| Compounds tested | Examples according to the invention | | | | | |
| | 1 | 2 | 3 | 4 | 5 | 6 |
| II-1 | 0.5 | 0.5 | 0.5 | 0.5 | | |
| II-2 | | | | | 0.5 | 0.5 |
| I-1 | 0.5 | | | | 0.5 | |
| I-2 | | 0.5 | 0.75 | 1.0 | | 0.5 |
| Discoloration | | | | | | |
| after 30 min. | py | py | py | py | py | py |
| after 60 min. | ybr | ybr | ybr | ybr | ybr | ybr |
| I.P. (min.) | 190 | 205 | 230 | 265 | 165 | 170 |
| ΔYI | 11.3 | 10.6 | 10.4 | 10.0 | 11.8 | 11.3 |
| Charpy impact value (kgf · cm/cm) | 20.4 | 21.3 | 21.8 | 21.9 | 18.9 | 18.3 |

Note: ybr = yellowish brown

TABLE 8

| | Added quantities (PHR) and test results | | | | | | | | | | | |
|---|---|---|---|---|---|---|---|---|---|---|---|---|
| Compounds tested | Comparison examples | | | | | | | | | | | |
| | 7 | 8 | 9 | 10 | 11 | 12 | 13 | 14 | 15 | 16 | 17 | 18 |
| II-1 | 0.5 | 0.5 | | | | | | | | | | |
| II-2 | | | 0.5 | 0.5 | | | | | | | | |
| AO-1 | | | | | 0.5 | 0.5 | 0.5 | 0.5 | | | | |
| AO-6 | | | | | | | | | 0.5 | 0.5 | 0.5 | 0.5 |
| I-1 | | | | | 0.5 | | | | 0.5 | | | |
| I-2 | | | | | | 0.5 | | | | 0.5 | | |
| AO-4 | 0.5 | | 0.5 | | | | 0.5 | | | | 0.5 | |
| AO-5 | | 0.5 | | 0.5 | | | | 0.5 | | | | 0.5 |
| Discoloration | | | | | | | | | | | | |
| after 30 min. | ybr | ybr | ybr | ybr | dbr | dbr | dbr | dbr | rbr | rbr | rbr | rbr |
| after 60 min. | dbr | dbr | dbr | dbr | bbr | bbr | bbr | bbr | bbr | bbr | bbr | bbr |
| I.P. (min.) | 130 | 130 | 110 | 95 | 150 | 150 | 140 | 125 | 155 | 145 | 140 | 130 |
| ΔYI | 12.5 | 12.0 | 13.1 | 12.4 | 14.3 | 14.5 | 15.0 | 13.8 | 17.1 | 16.9 | 17.3 | 15.9 |
| Charpy impact value (kgf · cm/cm) | 16.7 | 16.0 | 16.0 | 15.1 | 12.4 | 12.4 | 11.7 | 11.3 | 16.5 | 16.5 | 16.0 | 14.9 |

| | Comparison examples | | | | | | | | | | |
|---|---|---|---|---|---|---|---|---|---|---|---|
| Compounds tested | 19 | 20 | 21 | 22 | 23 | 24 | 25 | 26 | 27 | 28 | 29 (no addition) |
| II-1 | 0.5 | | | | | | | | | | |
| II-2 | | 0.5 | | | | | | | | | |
| AO-1 | | | 0.5 | | | | | | | | |
| AO-6 | | | | 0.5 | | | | | | | |
| I-1 | | | | | 0.5 | | | | | | |
| I-2 | | | | | | 0.5 | 0.75 | 1.0 | | | |
| AO-4 | | | | | | | | | 0.5 | | |
| AO-5 | | | | | | | | | | 0.5 | |
| Discoloration | | | | | | | | | | | |
| after 30 min. | ybr | ybr | dbr | rbr | dbr | dbr | dbr | dbr | dbr | dbr | dbr |
| after 60 min. | dbr | dbr | bbr | bbr | bbr | bbr | bbr | bbr | bbr | bbr | bbr |
| I.P. (min) | 120 | 95 | 110 | 110 | 30 | 30 | 40 | 45 | 20 | 20 | 10 |

TABLE 8-continued

| | Added quantities (PHR) and test results | | | | | | | | | | |
|---|---|---|---|---|---|---|---|---|---|---|---|
| ΔYI | 12.8 | 13.3 | 14.0 | 16.3 | 15.3 | 15.1 | 15.0 | 15.3 | 15.8 | 13.9 | 15.9 |
| Charpy impact value (kgf · cm/cm) | 14.8 | 14.5 | 11.8 | 14.7 | 9.4 | 9.4 | 9.8 | 9.9 | 8.1 | 7.5 | 7.2 |

Note:
dbr = deep brown
bbr = blackish brown
rbr = reddish brown

We claim:

1. A stabilizer for a polymeric substance selected from the group consisting of polybutadiene rubber, styrene-butadiene copolymer rubber, acrylonitrile-butadiene-styrene terpolymer resins and high impact polystyrene resins consisting essentially of a sulfur-containing compound of the general formula:

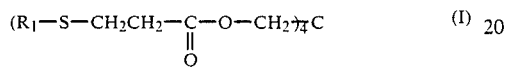

wherein $R_1$ represents an alkyl group having 4 to 20 carbon atoms and a phenolic compound of the general formula:

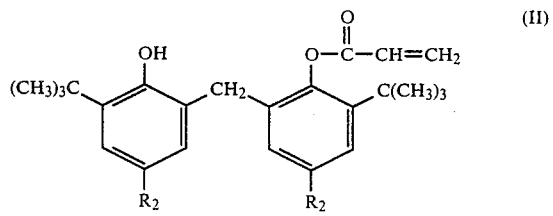

wherein $R_2$ represents an alkyl group having 1 to 4 carbon atoms, in the ratio (I):(II) of 1:0.1–2 by weight.

2. The stabilizer as claimed in claim 1 wherein the sulfur-containing compound is pentaerythritol-tetrakis(β-dodecyl thiopropionate).

3. The stabilizer as claimed in claim 1 wherein the phenolic compound is 2-(2-hydroxy-3-t-butyl-5-methylbenzyl)-4-methyl-6-t-butylphenyl acrylate.

4. A polymeric substance selected from the group consisting of polybutadiene rubber, styrene-butadiene copolymer rubber, acrylonitrile-butadiene-styrene terpolymer resins and high impact polystyrene resins, said composition stabilized with a sulfur-containing compound of the general formula:

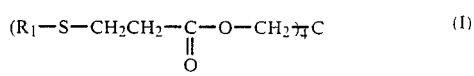

wherein $R_1$ represents an alkyl group having 4 to 20 carbon atoms and a phenolic compound of the general formula:

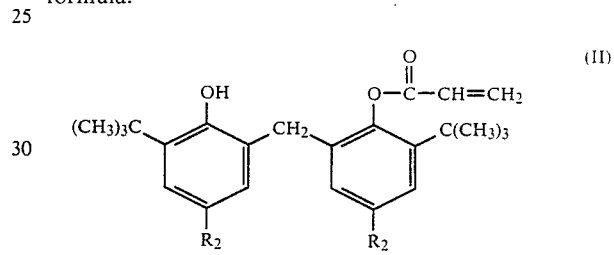

wherein $R_2$ represents an alkyl group having 1 to 4 carbon atoms, in the ratio (I):(II) of 1:0.1–2 by weight.

5. The stabilizer as claimed in claim 4 wherein the sulfur-containing compound is pentaerythritol-tetrakis(β-dodecyl thiopropionate).

6. The stabilizer as claimed in claim 5 wherein the phenolic compound is 2-(2-hydroxy-3-t-butyl-5-methylbenzyl-4-methyl-6-t-butylphenyl acrylate.

* * * * *